UNITED STATES PATENT OFFICE.

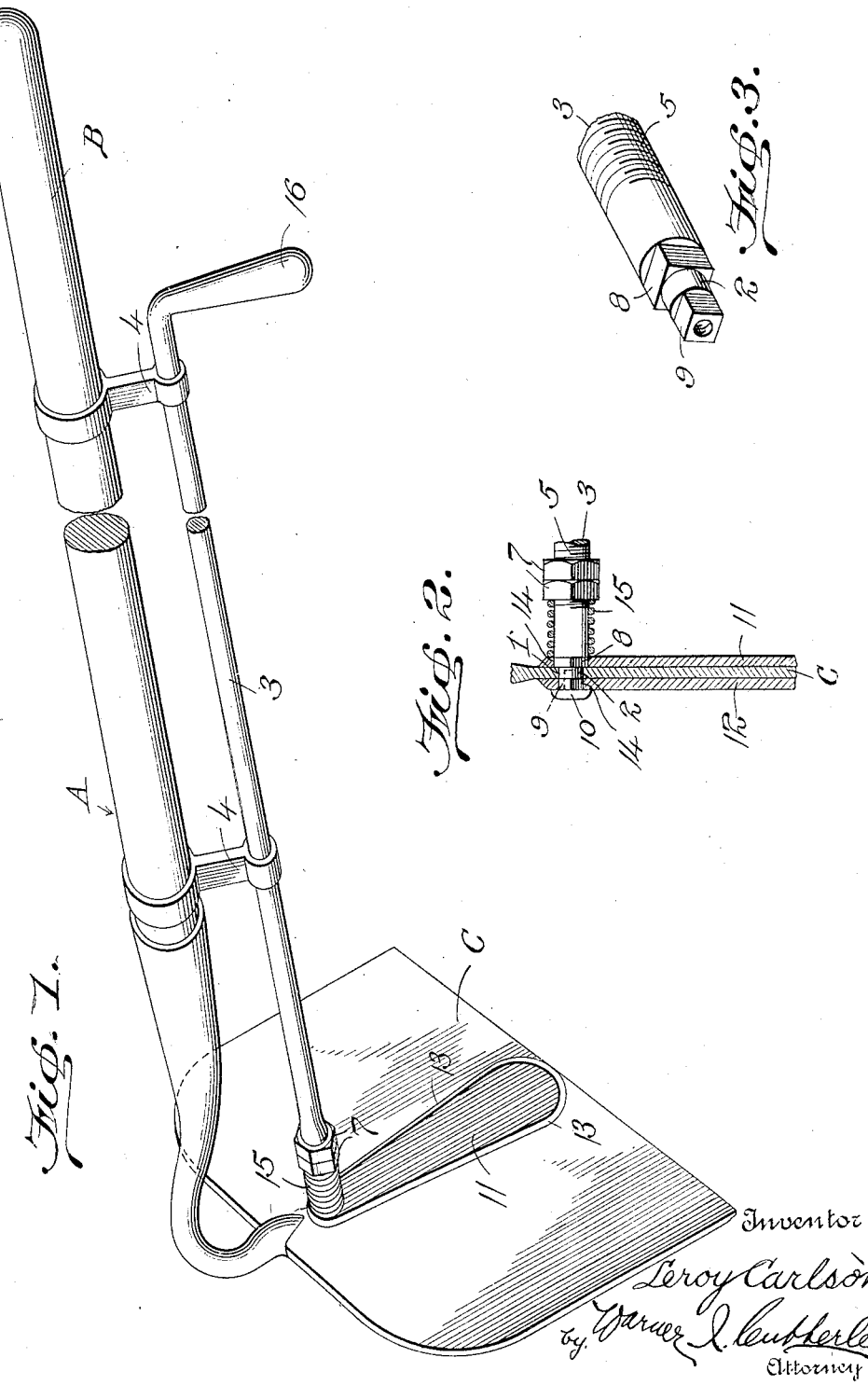

LEROY CARLSON, OF HANCOCK, MINNESOTA.

HOE-CLEANER.

1,373,486.	Specification of Letters Patent.	Patented Apr. 5, 1921.

Application filed July 19, 1920. Serial No. 397,258.

*To all whom it may concern:*

Be it known that I, LEROY CARLSON, a citizen of the United States, residing at Hancock, in the county of Stevens and State of Minnesota, have invented a new and useful Hoe-Cleaner, of which the following is a specification.

My invention relates to improvements in devices for cleaning hoes and other similar types of ground working implements.

Much inconvenience and delay has heretofore been experienced by accumulation of dirt, mud and the like upon the blades of hoes, thereby necessitating frequent pauses during work to remove the same. It is the primary object of my invention to provide a device for cleaning the blades of hoes and other similar implements, which may be manipulated from the handle of the implement at any time during the working of the same, thereby effecting a great saving in both time and labor. With this end in view I have mounted a pair of scraping blades upon a conventional hoe blade which are operable through the medium of a rod extending to a point adjacent the grip portion of the hoe handle, so that by actuating the rod the scraping blades will be moved across the hoe blade to cleanse the same of dirt, mud, and other accumulated matter.

Other and no less important objects of my invention are: to provide means for taking up any looseness occurring between working parts of my invention due to the abrasive action of sand and the like; to provide a hoe cleaning device which may be applied to conventional types of hoes and similar implements already in general use; and to provide a cleaning device which is exceedingly simple in construction and durable, and which may be manufactured and placed on the market at very small cost.

To these and other ends, the invention consists in the construction, arrangement and combination of parts described hereinafter and pointed out in the claims.

One embodiment of my invention is represented by way of example in the accompanying drawings, wherein;

Figure 1 is a perspective view of the hoe cleaner as applied to a conventional form of hoe.

Fig. 2 is a sectional view taken through the point of attachment of the cleaner to a hoe blade, and Fig. 3 is a detail view of the terminal of the operating rod.

In the drawing wherein like characters of reference designate like or similar parts throughout the several views;—

(A) designates generally a conventional type of hoe having a handle (B) and a blade (C) adjacent the shank of which an opening (1) is formed for receiving the reduced terminal (2) of a rod (3) attached to the handle (B) by clips (4) and extending parallel therewith to a point adjacent the grip portion thereof. The portion of the rod (3) adjacent the reduced terminal (2) is screw-threaded as at (5) to receive locking-nuts (7), and between the screw-threaded portion and the reduced portion the rod is squared as at (8). It will be noted that the terminal of the rod extends past the opposite side of the hoe when the same is positioned through the opening formed therein, and this free portion of the terminal is squared as at (9), and a screw-threaded opening is formed in the end for receiving a thumb screw (10).

A pair of scraper blades (11) and (12) are formed with rounded sharpened edges (13), and each is provided with a squared opening (14); the opening in the blade (11) being larger than the opening in the blade (12) as the blade (11) is adapted to receive the squared portion (8) of the rod through its opening (14), while the blade (12) is positioned with the squared end (9) extending through its opening (14) when the blades are mounted upon the rod (3) in the manner illustrated in Fig. 1. It is also pointed out that the ends of the blades adjacent the openings (14) are much narrower than the opposite ends so that the blades appear in plan view substantially egg-shaped.

For a reason which will hereinafter appear a coil spring (15) is mounted between the lock-nuts (7) and the blade (11) when the hoe cleaner is assembled.

In assembling the hoe cleaner the coil spring (15) is positioned on the rod (3) and the scraper blade (11) is mounted on the squared portion (8), whereupon the cylindrical reduced terminal (2) is positioned in the opening (1) in the hoe blade (C). The scraper blade (12) is then mounted upon the squared end (9) and the thumb screw mounted in the end to hold all of the parts securely in assembly. When the parts have been assembled the lock-nuts (7) are rotated to compress the spring (15) sufficiently to take up any slack between the separate parts and to hold the blades against the respective sides of the hoe blade. Any looseness between the respective parts due to the abrasive action of sand and the like will be automatically taken up by action of the coil spring, and the tension of the coil spring may be varied by simply changing the position of the lock nuts on the rod.

In operation, when it is desired to remove an accumulation of dirt or mud from the hoe blade (C) the rod (3) is turned by means of an operating lever (16) formed on its end adjacent the grip end of the handle, consequently moving the scraper blades (11) and (12) across the hoe blade. While the attaching clips (4) are here shown as fastened to the handle of the hoe by screws, it is pointed out that a spring clip may be made to serve equally as well for the purpose.

While in the foregoing, there has been illustrated in the drawings and described in the specification such combination and arrangement of elements as constitute the preferred embodiment of my invention, it is nevertheless desired to emphasize the fact that interpretation of the invention should only be conclusive when made in the light of the subjoined claims.

Having described the invention and its objects with such attention to detail as will thoroughly acquaint one skilled in the art with its construction and advantages, I claim 1. A cleaning device for ground working implements comprising laterally swingable cleaning members, and means for actuating the cleaning members operable from a point adjacent the grip portion of the handle of a ground working implement.

2. A cleaning device for ground working implements comprising laterally swingable cleaning members, and means for automatically adjusting the cleaning members and compensating for wear of the same with respect to an implement blade.

3. A cleaning device for ground working implements having blades, comprising connected, laterally swingable cleaning members mounted on opposite sides of the blade, and means for operating the cleaning members.

4. A cleaning device for ground working implements having blades, comprising laterally swingable cleaning members on opposite sides of the blade, inherently resilient means for automatically adjusting the pressure of the cleaning members against the blade, and means for swinging the cleaning members to clean the blade.

5. A hoe cleaner comprising laterally swingable independent co-active cleaning blades mounted on opposite sides of the hoe blade, and bearing thereagainst, and means for swinging the cleaning blades to clean the hoe blade.

6. A hoe cleaner comprising laterally swingable independent, co-active cleaning blades mounted on opposite sides of a hoe blade, and a spring bearing against one cleaning blade for automatically adjusting the pressure of the cleaning blades upon the hoe blade.

7. A hoe cleaner comprising laterally swingable cleaning blades mounted on opposite sides of a hoe blade, means for operating the cleaning blades, and inherently resilient adjustable means carried on the operating means for automatically regulating the pressure of the cleaning blades on a hoe blade and taking up looseness caused by wear of the blades and operating means.

8. A hoe cleaner comprising laterally swingable cleaning blades, means for actuating said blades, and an adjustable spring mounted on the aforesaid means and bearing against one of the blades for automatically regulating the pressure of both of the cleaning blades on a hoe blade and taking up looseness caused by wear of the blades and operating means.

In testimony whereof, I affix my signature hereto.

LEROY CARLSON.